United States Patent [19]

Suga et al.

[11] Patent Number: 5,735,366
[45] Date of Patent: Apr. 7, 1998

[54] DISK BRAKE ROTOR EXHIBITING DIFFERENT MODES OF VIBRATION ON OPPOSITE SIDES DURING BRAKING

[75] Inventors: Toshitaka Suga, Nagoya; Masayoshi Katagiri, Toyota, both of Japan

[73] Assignee: Aisin Seiki Kabushiki Kaisha, Kariya, Japan

[21] Appl. No.: 715,910

[22] Filed: Sep. 19, 1996

[30] Foreign Application Priority Data

Sep. 19, 1995 [JP] Japan .................... 7-240236
Aug. 8, 1996 [JP] Japan .................... 8-210288

[51] Int. Cl.⁶ .................................... F16D 65/847
[52] U.S. Cl. .......................... 188/218 X; 188/250 E
[58] Field of Search ....................... 188/218, 218 R, 188/73.34, 73.35, 73.36, 250 E

[56] References Cited

U.S. PATENT DOCUMENTS 4,379,501  4/1983  Hagiwara et al. ............... 188/218 X

FOREIGN PATENT DOCUMENTS 62-97329  6/1987  Japan .

OTHER PUBLICATIONS

Stock Car Racing Magazine, Feb. 1997, p. 74.

Primary Examiner—Matthew C. Graham
Attorney, Agent, or Firm—Burns, Doane, Swecker & Mathis, LLP

[57] ABSTRACT

A disc brake rotor has a plurality of radial groves on its opposite sides that are equiangularly spaced. The angular interval of the grooves on one side is different from the angular interval of the grooves on the other side, so that the vibrations of two different modes caused by the grooves on the opposite sides interfere with each other during braking operation. By thus suppressing stationary wave mode vibrations, the disc brake rotor prevents production of brake squeals.

14 Claims, 8 Drawing Sheets

Fig. 12

| | angles of the radial grooves 14 | | | | | | | | | | |
|---|---|---|---|---|---|---|---|---|---|---|---|
| | $\theta_1$ | $\theta_2$ | $\theta_3$ | $\theta_4$ | $\theta_5$ | $\theta_6$ | $\theta_7$ | $\theta_8$ | $\theta_9$ | $\theta_{10}$ | $\theta_{11}$ |
| $\theta_1$ |   | O | X | O | O | X | O | O | O | X | O |
| $\theta_2$ | O |   | O | O | O | O | X | O | O | O | O |
| $\theta_3$ | X | O |   | O | X | X | O | X | O | X | X |
| $\theta_4$ | O | O | O |   | O | O | O | O | X | O | O |
| $\theta_5$ | O | O | X | O |   | O | O | X | O | O | X |
| $\theta_6$ | X | O | X | O | O |   | O | O | O | X | O |
| $\theta_7$ | O | X | O | O | O | O |   | O | O | O | O |
| $\theta_8$ | O | O | X | O | X | O | O |   | O | O | X |
| $\theta_9$ | O | O | O | X | O | O | O | O |   | O | O |
| $\theta_{10}$ | X | O | X | O | O | X | O | O | O |   | O |
| $\theta_{11}$ | O | O | X | O | X | O | O | X | O | O |   |

(row labels: angles of the radial grooves 15)

X : NO GOOD
O : GOOD

DISK BRAKE ROTOR EXHIBITING DIFFERENT MODES OF VIBRATION ON OPPOSITE SIDES DURING BRAKING

FIELD OF THE INVENTION

The present invention relates to a rotor used in a disc brake, and more particularly pertains to a disc brake rotor used in a vehicle wheel brake that significantly reduces and substantially eliminates or prevents brake squeals.

BACKGROUND OF THE INVENTION

It is known that while producing brake noises or squeals, a vehicular disc brake rotor undergoes vibrations of a stationary-wave mode where the nodes and loops of the vibrations in the axial direction of the rotor alternate in the circumferential direction. Although the number of nodes produced in a rotor varies depending on the dimensions and shape of the rotor, rotors of ordinary dimensions and shapes produce two to ten nodes.

Japanese utility model application laid-open No. SHO 62-97329 proposes a rotor that has a plurality of radial grooves extending from the inner circumference to the outer circumference and spaced equiangularly on one of the sides of the rotor and a plurality of radial grooves formed on the other side symmetrically with those on the first side. The radial grooves are designed to suppress brake squeals by causing a mode of vibration having a number of nodes that has been experimentally found to substantially prevent or reduce brake squeals.

However, in the aforementioned proposal, since the number of nodes caused by the grooves formed on one side of the rotor is the same as the number of nodes caused by the grooves formed on the other side, the vibrations of the mode caused by the grooves on one side of the rotor is enhanced by the grooves on the other side. The result is vibrations of a stationary wave mode. Thus, it has been found that this proposed construction is likely to produce brake squeals.

SUMMARY OF THE INVENTION

In light of the foregoing, a need exists for a disc brake rotor that significantly reduces and substantially prevents or eliminates vibrations of a stationary wave mode that would otherwise produce brake squeals.

According to the present invention, a disc brake rotor includes a plurality of grooves extending from the inner circumferential boundary to the outer circumferential boundary on one of opposite side surfaces of a disc portion, and a plurality of grooves extending from the inner circumferential boundary to the outer circumferential boundary on the opposite side surface of the disc portion. The grooves formed in the one side are substantially equally spaced from one another at a first angle and the grooves in the opposite side are also substantially equally spaced from one another by a second angle that is different from the first angle.

This rotor causes different modes of vibration on the opposite sides of the rotor during braking operation, so that the two modes of vibrations interfere with each other to suppress production of vibrations of a stationary wave mode. The rotor thus substantially prevents brake squeals.

BRIEF DESCRIPTION OF THE DRAWING FIGURES

The foregoing and further objects, features and advantages of the present invention will become apparent from the following detailed description of preferred embodiments considered in conjunction with the accompanying drawing figures in which like elements are designated by like reference numerals and wherein:

FIG. 12 is a table identifying possible spacing or angular intervals for the grooves on opposite side surfaces of the disc portion.

DETAILED DESCRIPTION OF PREFERRED EMBODIMENTS

Figure 1:
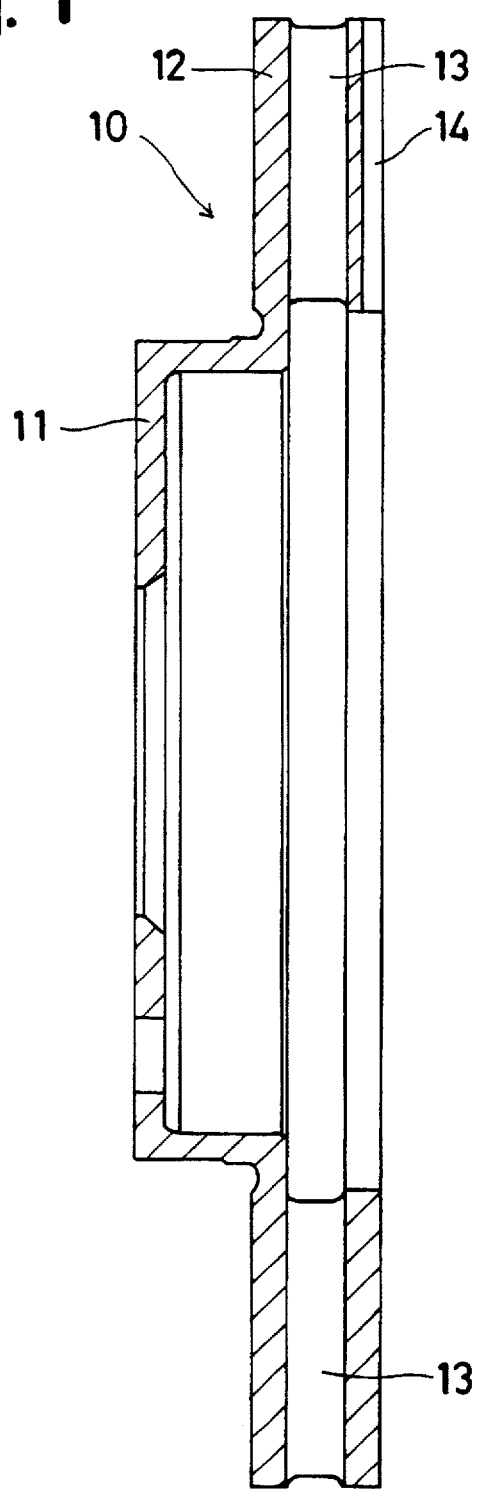
FIG. 1 is a cross-sectional view of a ventilated rotor according to a first embodiment of the present invention.
Figure 2:
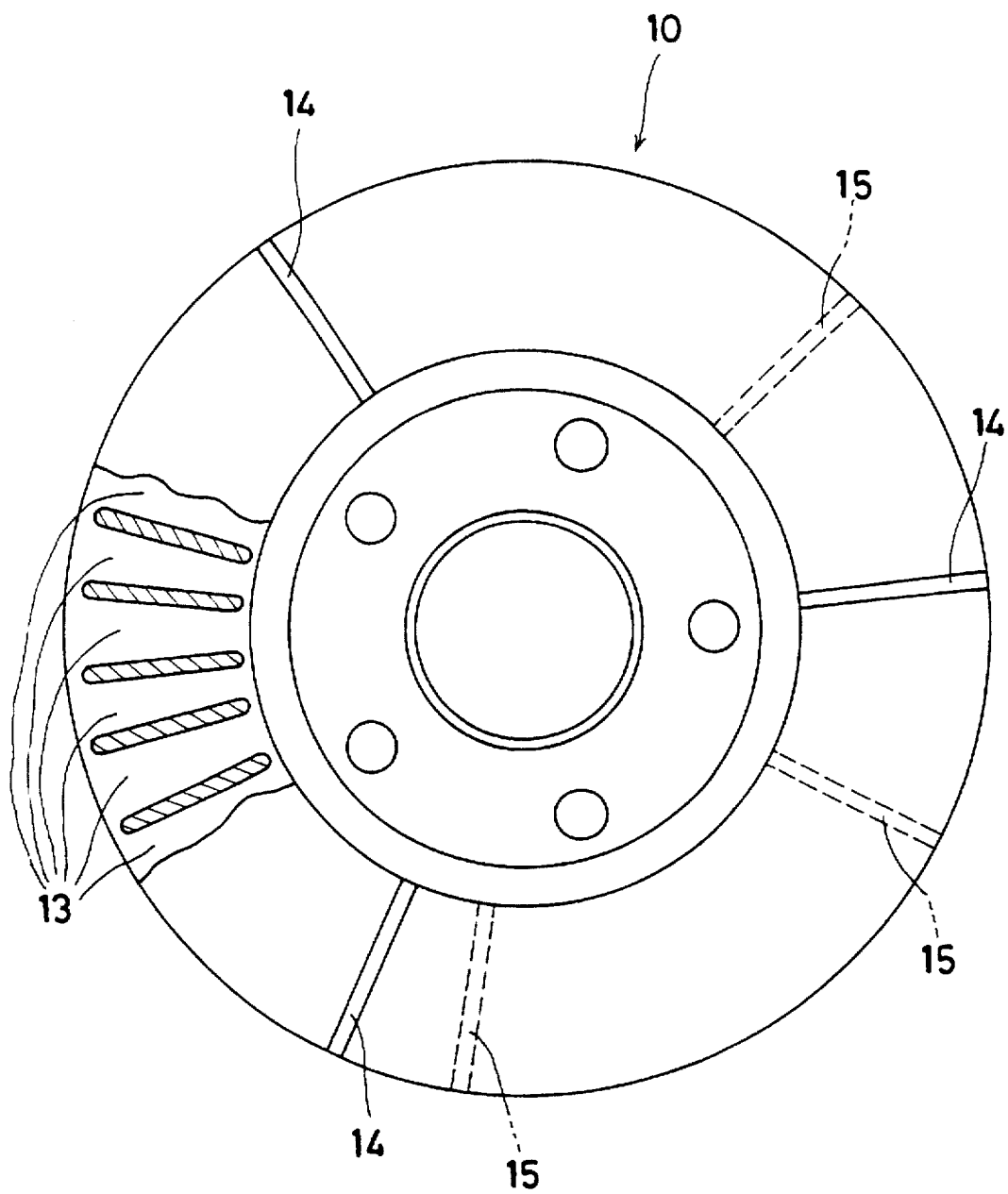
FIG. 2 is a right side view, partially in section, of the ventilated rotor shown in FIG. 1.
Figure 3:
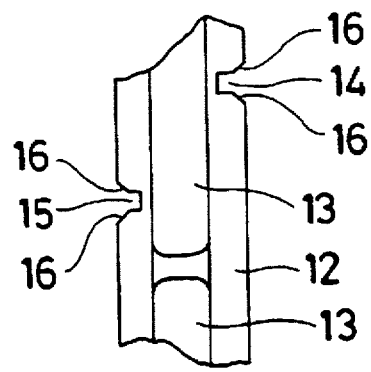
FIG. 3 is a top view of a portion of the ventilated rotor shown in FIG. 1.

Referring to FIGS. 1 to 3, a so-called ventilated rotor 10 according to a first embodiment of the present invention includes a mount portion 11 and a disc portion 12. The mount portion 11 is provided with a central opening and is adapted to be attached to a wheel hub (not specifically shown) of a vehicle wheel. The disc portion 12 is positioned radially outwardly at the hub portion 11 and is adapted to frictionally contact brake pads (not specifically shown) associated with the vehicle wheel.

Formed within the disc portion 12 are a plurality of ventilation passages 13 extending radially from the inner circumference to the outer circumference of the disc portion 12. The radially oriented passages are thirty six in number and equally spaced at 10° intervals.

Radial grooves 14 extend radially from the inner circumference to the outer circumference of the disc portion 12 on the right side surface of the disc portion 12 shown in FIG. 1. The right side surface of the disc portion 12 shown in FIG. 1 represents the inside surface of the disc portion 12 when the rotor 10 is mounted on a vehicle. In the illustrated embodiment shown, the radial grooves 14 are three in number and are equiangularly spaced circumferentially around the rotor at 120° intervals as indicated by solid lines in FIG. 2.

Radial grooves 15 extend radially from the inner circumference to the outer circumference on the other side surface of the disc portion 12 (i.e., the side surface opposite the side surface on which are disposed the grooves 14). In the illustrated embodiment, the radial grooves 15 are five in number and are equiangularly spaced circumferentially about the rotor at 72° intervals as indicated by broken lines in FIG. 2.

Preferably, each of the radial grooves 14, 15 has chamfers 16 at both of the opening edge portions that are contiguous to the plane of the corresponding side surface of the rotor 10 as shown in FIG. 3. The chamfers are designed to reduce abrasion of the brake pads. Instead of providing the chamfers 16, the radial grooves 14, 15 may be formed into a "V" cross-sectional shape such that the side wall surfaces of the grooves make an obtuse angle with respect to the contiguous side surface areas of the rotor 10.

Figure 4:
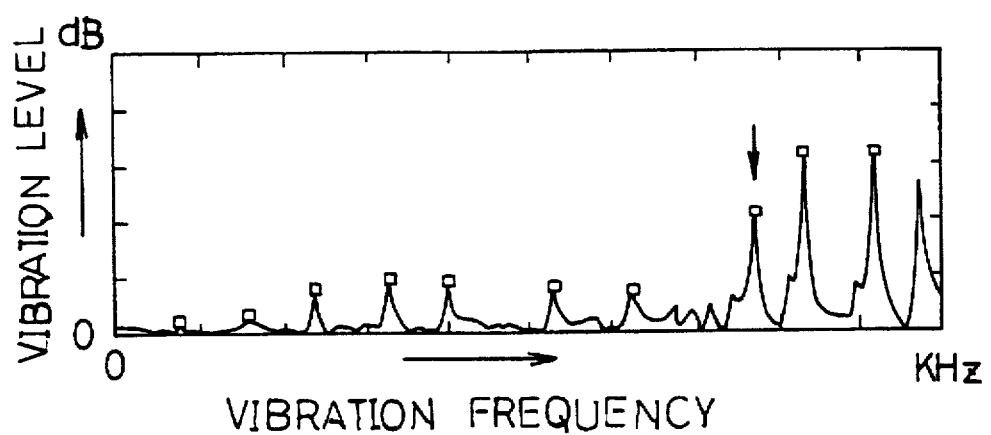
FIG. 4 is a graph illustrating the vibration responsiveness of a conventional ventilated rotor.
Figure 5:
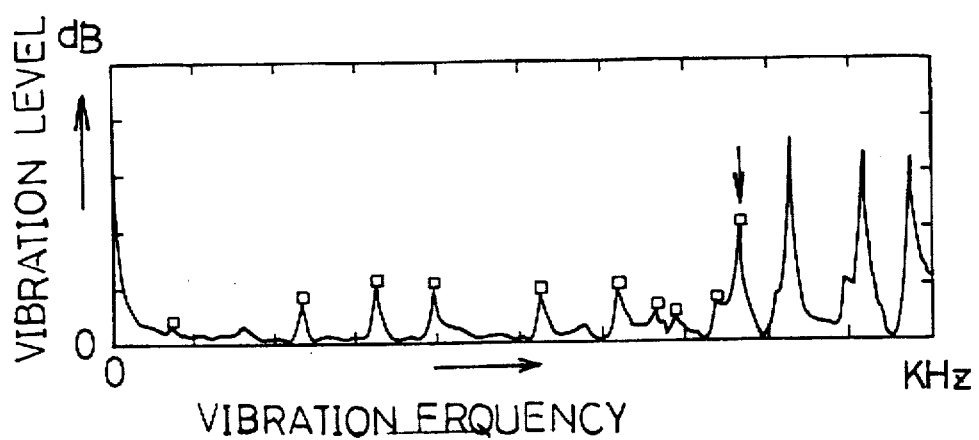
FIG. 5 is a graph illustrating the vibration responsiveness of a conventional ventilated rotor having radial grooves.
Figure 6:
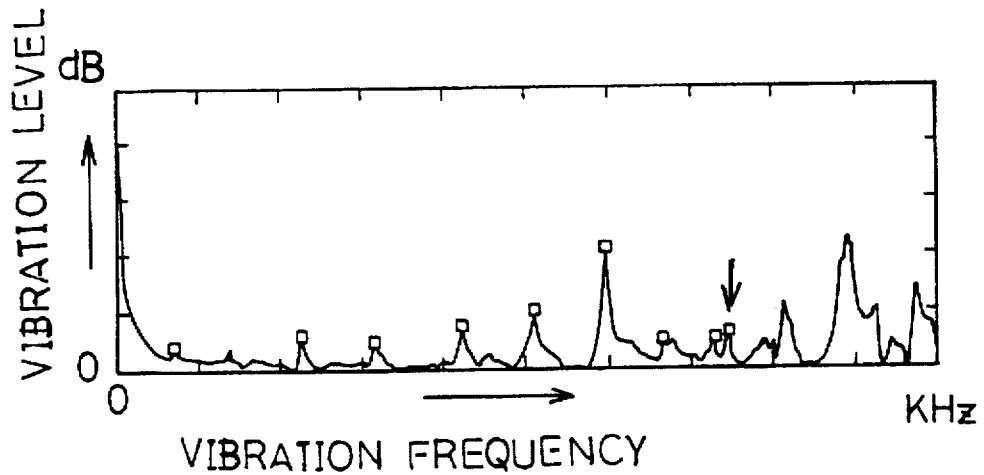
FIG. 6 is a graph illustrating the vibration responsiveness of the ventilated rotor shown in FIG. 1.

The graphs of FIGS. 4-6 indicate the vibration responsiveness of several different ventilated rotors. In each of the graphs, the abscissa axis indicates the vibration frequency (in the unit of kHz), and the ordinate axis indicates the vibration level (in the unit of dB). FIG. 4 indicates the vibration responsiveness of a ventilated rotor having no radial grooves on either side surface. FIG. 5 illustrates the vibration responsiveness of a ventilated rotor having three radial grooves provided symmetrically on each of the opposite sides, and FIG. 6 depicts the vibration responsiveness of the ventilated rotor 10 of the present invention shown in FIGS. 1-3. While the conventional ventilated rotors produced brake squeals at frequencies indicated by arrows in FIGS. 4 and 5, the ventilated rotor 10 according to the present invention produced significantly reduced levels of vibrations at those same frequencies as indicated by an arrow in FIG. 6, and produced no brake squeals.

The disc rotor of the present invention is designed so that the mode of vibration produced on one side of the rotor during braking operation differs from the mode of vibration produced on the other side of the rotor during braking operation. The two modes of vibrations thus interfere with each other to suppress the production of vibrations of a stationary wave mode. In this way, the rotor significantly reduces and substantially prevents or eliminates brake squeals.

The number of nodes of vibration of the modes caused by the radial grooves 14, 15 is based upon or determined by the angular interval between the grooves 14, 15. In other words, the number of nodes of vibrations of the modes caused by each of the radial grooves is the same as the common divisors associated with the number of radial grooves. By way of example, and as identified below, the use of six radial grooves causes 2 nodes and 3 nodes to be produced (the numbers 2 and 3 representing the common divisors for the number of grooves) while the use of twelve grooves causes 2, 3, 4 and 6 nodes to be produced (the numbers 2, 3, 4 and 6 representing the common divisors for the number of grooves).

According to the present invention, the angular interval at which the radial grooves 14 are spaced from one another and the angular interval at which the radial grooves 15 are spaced from one another are determined as a combination of two angles selected from a group of the following angles $\theta_1$–$\theta_{11}$. The two angles are selected such that the two selected angles do not cause an equal number of nodes, except possibly for the situation where both selected angles cause two nodes of vibration.

In other words, in accordance with the present invention, when selecting an angular spacing for the radial grooves 14 and the radial grooves 15, the number of nodes of vibration associated with each particular spacing should be considered, and the angular spacing for each set of radial grooves should be selected so that the number of nodes produced by the selected angular spacing for the one set of radial grooves 14 is not equal to the number of nodes produced by the selected angular spacing for the other set of radial grooves 15, except that the angular spacing for the two sets of radial grooves 14, 15 can be selected such that they both cause 2 nodes to occur.

$\theta_1 = 360°/16$ ... 2, 4, 8 nodes
$\theta_2 = 360°/14$ ... 2, 7 nodes
$\theta_3 = 360°/12$ ... 2, 3, 4, 6 nodes
$\theta_4 = 360°/10$ ... 2, 5, 10 nodes
$\theta_5 = 360°/9$ ... 3, 9 nodes
$\theta_6 = 360°/8$ ... 2, 4 nodes
$\theta_7 = 360°/7$ ... 7 nodes
$\theta_8 = 360°/6$ ... 2, 3, nodes
$\theta_9 = 360°/5$ ... 5 nodes
$\theta_{10} = 360°/4$ ... 2, 4 nodes
$\theta_{11} = 360°/3$ ... 3 nodes Thus, the angular intervals $\theta_1$–$\theta_{11}$ identified above are variations of the angular intervals of each of the radial grooves 14, 15. The associated nodes are caused by radial grooves having one of the angular intervals $\theta_1$–$\theta_{11}$. For example, when four radial grooves are provided and are spaced apart at an interval of 90° as represented by the angular interval $\theta_{10}$ above, vibrations having two and four nodes occur.

To significantly reduce or substantially eliminate stationary wave vibrations, the angular intervals of the radial grooves 14, 15 are selected from the above-identified angles and are selected such that the two selected angles do not cause the same number of vibrational nodes. Because the frequency of a wave having two nodes is relatively low and squealing noise typically occurs at a relatively high frequency, the angular interval or spacing for the two sets of radial grooves 14, 15 may be selected such that both angular intervals cause two nodes of vibration. This will widen the potential selections for the angular intervals of the two sets of radial grooves 14, 15.

The table shown in FIG. 12 identifies combinations of angular intervals for the two sets of radial grooves 14, 15 which are good and which are designed to further the objectives of the present invention. The table shown in FIG. 12 also identifies combinations of angular intervals for the two sets of radial grooves 14, 15 which are bad and should be avoided.

Figure 7:
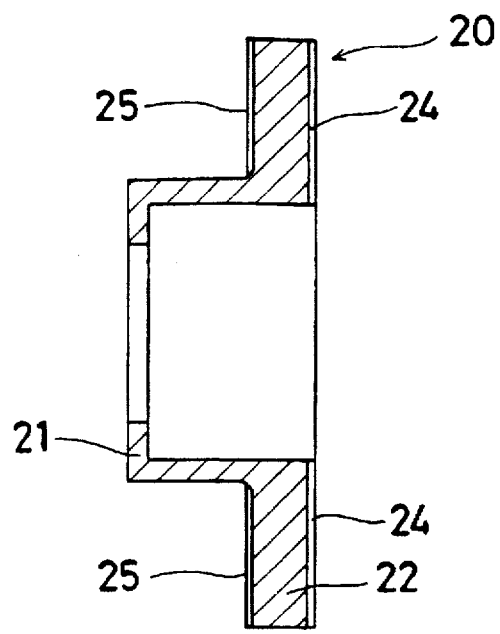
FIG. 7 is a cross-sectional view of a ventilated rotor according to a second embodiment of the present invention.
Figure 8:
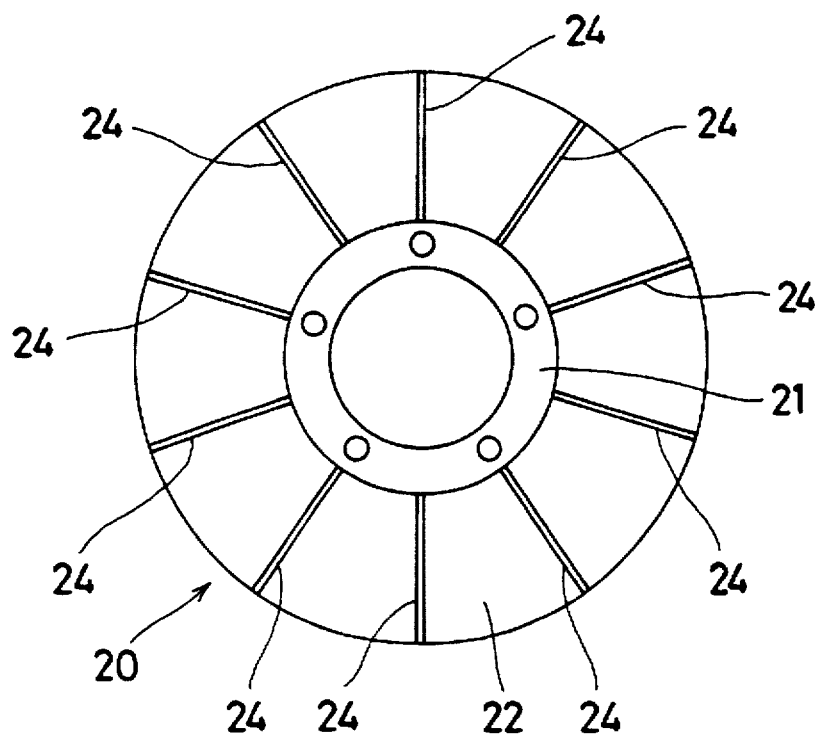
FIG. 8 is a right side view of the embodiment of the ventilated rotor shown in FIG. 7.
Figure 9:
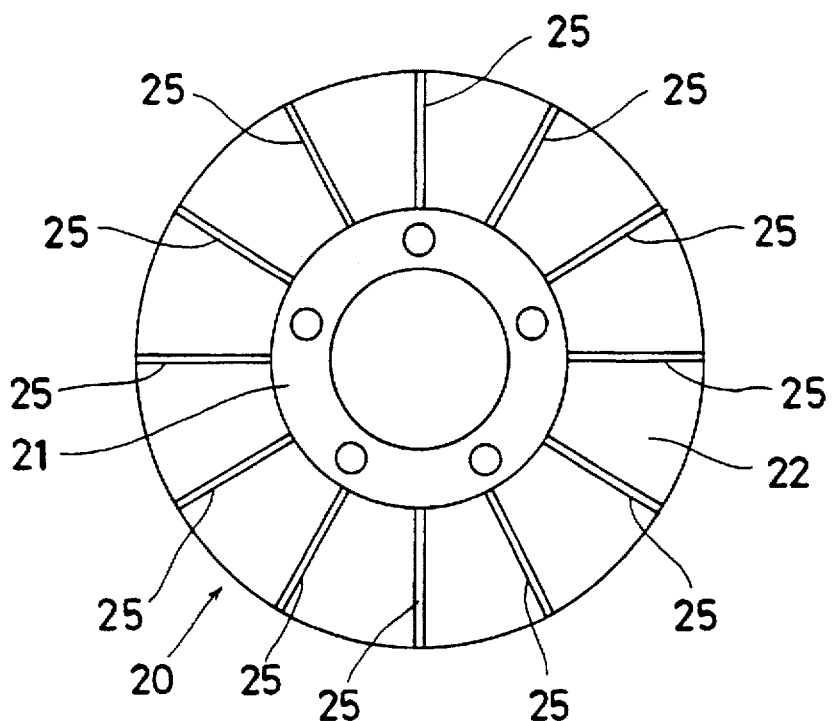
FIG. 9 is a left side view of the embodiment of the ventilated rotor shown in FIG. 7.

FIGS. 7-9 show a second embodiment of the present invention. In this embodiment, a rotor 20 is a so-called solid rotor comprising a mount portion 21 for attachment to a wheel hub (not specifically shown) and a disc portion 22 that frictionally contacts the brake pads (not specifically shown) on a vehicle. Radial grooves 24 extend radially from the inner circumference to the outer circumference of the disc portion 22 in a side surface thereof (that is, the right-side surface in FIG. 7, which becomes the inside surface when the rotor 20 is mounted on a vehicle), and ten of the grooves 24 are equiangularly spaced (by an interval of 360°), as shown in FIG. 8. Radial grooves 25 extend radially from the inner circumference to the outer circumference in the opposite side of the disc portion 22. In the illustrated arrangement, twelve of the radial grooves 25 are equiangularly spaced (by interval of 30°), as shown in FIG. 9.

Figure 10:
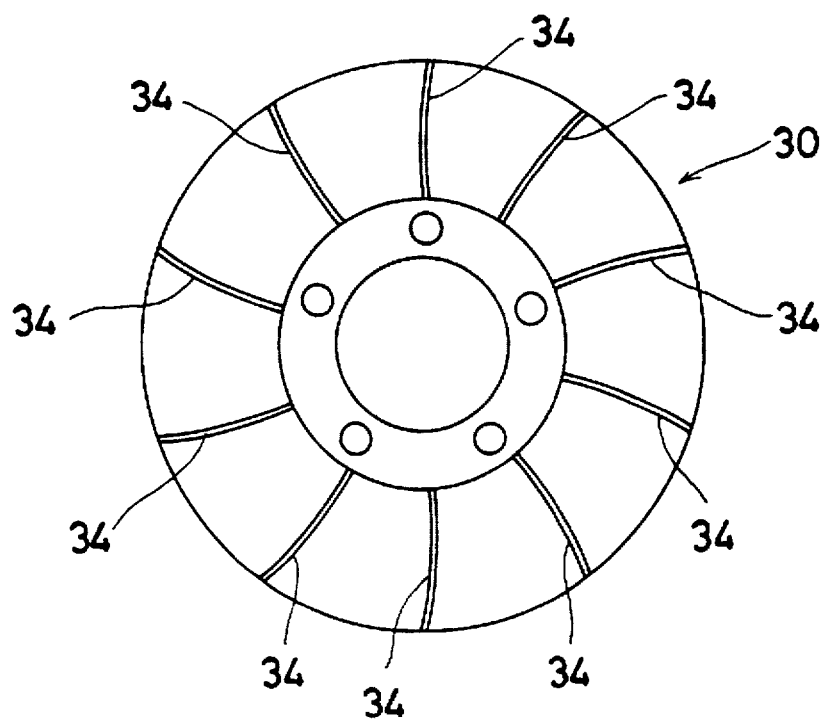
FIG. 10 is a side view of a ventilated rotor according to a third embodiment of the present invention.
Figure 11:
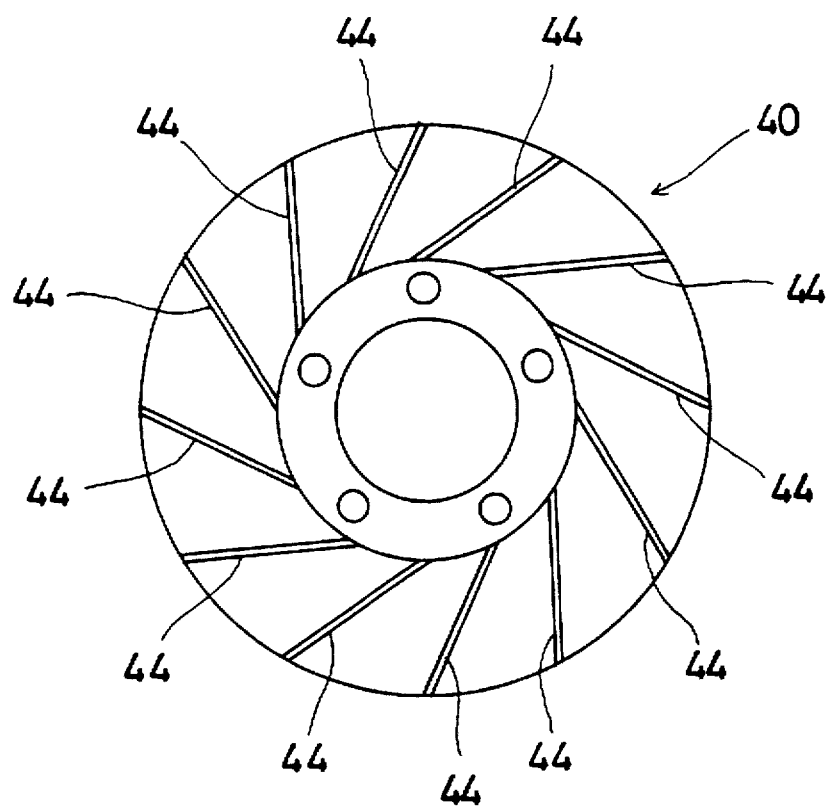
FIG. 11 is a side view of a ventilated rotor according to a fourth embodiment of the present invention.

Although the radial grooves 14, 15, 24, 25 are illustrated in the first and second embodiments as being generally linear according to the first and second embodiments, it is possible to provide curved radial grooves 34 on a rotor 30 in the manner shown in FIG. 10. Furthermore, as shown in FIG. 11, the radial grooves 44 can be angled with respect to radii of the rotor 40 rather than being radially oriented in the manner shown in FIGS. 1 and 2.

According to the embodiments of the present invention, the disk brake rotor is designed so that during braking operation, the disc brake rotor causes vibrations of two different modes which interfere with each other to suppress vibrations of a stationary-wave mode, thus substantially preventing production of brake squeals.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A disc brake rotor comprising:
   a rotor that includes a disc portion having an inner circumferential boundary and an outer circumferential boundary, said disc portion also having oppositely disposed first and second side surfaces for contacting a brake pad device;
   a plurality of first grooves extending from the inner circumferential boundary to the outer circumferential boundary on the first side surface of the disc portion, said first grooves being substantially equally spaced by a first angular interval; and
   a plurality of second grooves extending from the inner circumferential boundary to the outer circumferential boundary in the second side surface of the disc portion, said second grooves being substantially equally spaced at a second angular interval that is different from the first angular interval.

2. A disc brake rotor according to claim 1, wherein the grooves are arranged radially with respect to the disc portion.

3. A disc brake rotor according to claim 1, wherein the disc portion has a plurality of ventilation passages extending from the inner circumferential boundary to the outer circumferential boundary of the disc portion, the ventilation passages being located intermediate the first and second side surfaces of the disc portion.

4. A disc brake rotor according to claim 1, wherein an opening edge portion of each of the first grooves that is contiguous to the first side surface of the disc portion has a chamfer.

5. A disc brake rotor according to claim 1, wherein an opening edge portion of each of the second grooves that is contiguous to the second side surface of the disc portion has a chamfer.

6. A disc brake rotor according to claim 1, wherein the number of the first grooves formed in said first side surface and the number of the second grooves formed in said second side surface are such that, except for two nodes, the numbers of nodes of vibrations caused by the first grooves differ from all of the numbers of nodes of vibrations caused by the second grooves.

7. A disc brake rotor according to claim 1, wherein the first and second grooves extend linearly and are angled with respect to radii of the disc portion.

8. A disc brake rotor according to claim 1, wherein at least the first grooves are curved.

9. A disc brake rotor according to claim 1, wherein at least the second grooves are curved.

10. A disc brake rotor, comprising:
    a rotor that includes a disc portion having an inner circumferential boundary and an outer circumferential boundary, said disc portion also having oppositely disposed first and second side surfaces for contacting a brake pad device;
    a plurality of first grooves extending from the inner circumferential boundary to the outer circumferential boundary on the first side surface of the disc portion, said first grooves being substantially equally spaced by a first angular interval, the first angular interval producing a first number of nodes; and
    a plurality of second grooves extending from the inner circumferential boundary to the outer circumferential boundary in the second side surface of the disc portion, said second grooves being substantially equally spaced at a second angular interval, the second angular interval producing a second number of nodes, such that, except for two nodes, the numbers of nodes of vibrations caused by the first grooves differ from all of the numbers of nodes of vibrations caused by the second grooves.

11. A disc brake rotor according to claim 10, wherein the grooves are arranged radially with respect to the disc portion.

12. A disc brake rotor according to claim 10, wherein the disc portion has a plurality of ventilation passages extending from the inner circumferential boundary to the outer circumferential boundary of the disc portion, the ventilation passages being located intermediate the first and second side surfaces of the disc portion.

13. A disc brake rotor according to claim 10, wherein at least the first grooves are curved.

14. A disc brake rotor according to claim 10, wherein at least the second grooves are curved.

* * * * *